US011277481B1

(12) United States Patent
Wang et al.

(10) Patent No.: US 11,277,481 B1
(45) Date of Patent: Mar. 15, 2022

(54) CONTENT SELECTION THROUGH INTERMEDIARY DEVICE

(71) Applicant: Google LLC, Mountain View, CA (US)

(72) Inventors: Gang Wang, Mountain View, CA (US); Yian Gao, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/895,149

(22) Filed: Jun. 8, 2020

Related U.S. Application Data

(63) Continuation of application No. 15/961,748, filed on Apr. 24, 2018, now Pat. No. 10,681,148.

(51) Int. Cl.

| | |
|---|---|
| ***G06F 15/16*** | (2006.01) |
| ***H04L 67/146*** | (2022.01) |
| ***H04L 67/53*** | (2022.01) |
| ***H04L 67/306*** | (2022.01) |
| *H04L 67/02* | (2022.01) |
| *H04L 29/06* | (2006.01) |

(52) U.S. Cl.
CPC ............ *H04L 67/146* (2013.01); *H04L 67/20* (2013.01); *H04L 67/306* (2013.01); *H04L 63/08* (2013.01); *H04L 67/02* (2013.01)

(58) Field of Classification Search
CPC ..... H04L 67/146; H04L 67/306; H04L 67/20; H04L 67/02; H04L 63/08
See application file for complete search history.

(56) References Cited

U.S. PATENT DOCUMENTS

| | | | | |
|---|---|---|---|---|
| 7,937,477 | B1 * | 5/2011 | Day | H04L 63/102 709/227 |
| 9,344,505 | B1 * | 5/2016 | Martin | H04L 67/146 |
| 10,049,392 | B2 | 8/2018 | Wilson | |
| 10,360,279 | B2 * | 7/2019 | Dillon | G06F 16/9574 |
| 10,810,279 | B2 * | 10/2020 | Goel | H04L 67/02 |
| 2002/0169961 | A1 | 11/2002 | Giles et al. | |
| 2007/0180125 | A1 | 8/2007 | Knowles et al. | |
| 2011/0283359 | A1 * | 11/2011 | Prince | H04L 61/2007 726/23 |
| 2014/0372225 | A1 * | 12/2014 | Tawakol | G06Q 30/0269 705/14.66 |
| 2017/0180495 | A1 * | 6/2017 | Comstock | H04L 67/02 |

OTHER PUBLICATIONS

Non-Final Office Action for U.S. Appl. No. 15/961,748 dated Aug. 5, 2019 (9 pages).
Notice of Allowance for U.S. Appl. No. 15/961,748 dated Jan. 29, 2020 (9 pages).

* cited by examiner

*Primary Examiner* — Cheikh T Ndiaye
(74) *Attorney, Agent, or Firm* — Fish & Richardson P.C.

(57) ABSTRACT

The systems and methods described herein can enable the selection of customized content in networked systems that prevent the transfer of session data between different domains. The systems and methods described herein enable the exchange of data between third-party entities that would be blocked in networked systems that prevent cross-domain data exchange. The systems and methods can provide multi-sourced content without sacrificing security of the client device and browser environment.

20 Claims, 4 Drawing Sheets

CONTENT SELECTION THROUGH INTERMEDIARY DEVICE

CROSS-REFERENCE TO RELATED APPLICATIONS

The present application is a continuation of and claims priority to U.S. patent application Ser. No. 15/961,748, filed Apr. 24, 2018, and entitled "CONTENT SELECTION THROUGH INTERMEDIARY DEVICE", the contents of which is incorporated herein by reference in its entirety.

BACKGROUND OF THE DISCLOSURE

When a client device visits a website, the website can transmit small packets of data to the client device. The small packets of data can include preferences, session information, or information to be used to authenticate and maintain a session between the client device and the device hosting the website. The data stored in the client device by the website can be stored indefinitely or can be purged at regular intervals. In some implementations, to prevent malicious attacks known as cross-site or cross-domain attacks or undesired behavior, web browsers can prevent domains from accessing the data of other domains or from storing data on the client device when the client device is not in an active session with the domain.

SUMMARY OF THE DISCLOSURE

In some implementations, client devices can routinely purge locally stored session data. Without the session data, different domains may not be able to authenticate the client device or provide the client device with customized content based on the session data. The systems and methods described herein can enable the indirect transmission of session data between different domains. The system can use the indirectly transmitted session data to provide session specific content to the client device even if the session data is locally purged.

The foregoing general description and following description of the drawings and detailed description are exemplary and explanatory and are intended to provide further explanation of the invention as claimed. Other objects, advantages, and novel features will be readily apparent to those skilled in the art from the following brief description of the drawings and detailed description.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
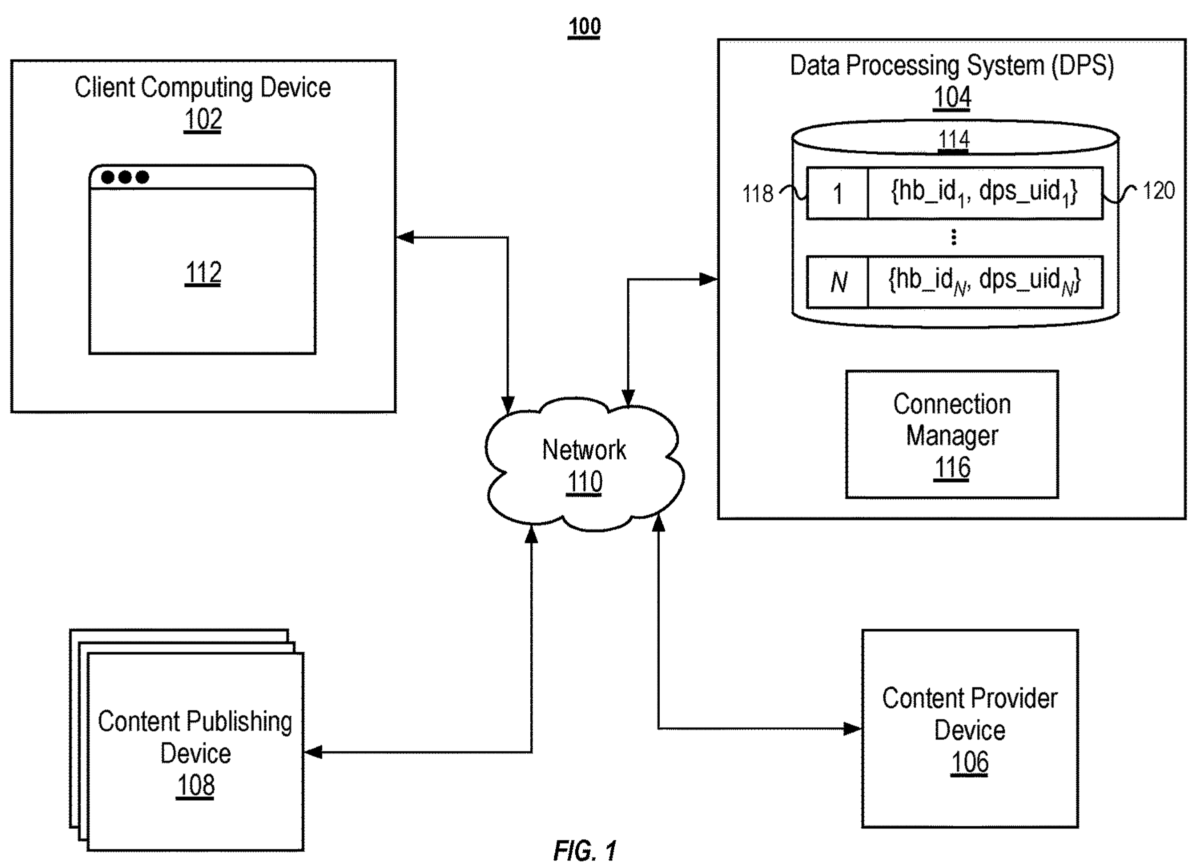
FIG. 1 illustrates a block diagram of an example system for the indirect communication of data, according to one implementation.

The various concepts introduced above and discussed in greater detail below may be implemented in any of numerous ways, as the described concepts are not limited to any particular manner of implementation. Examples of specific implementations and applications are provided primarily for illustrative purposes.

When a client device renders a website provided by a content provider and executes the code of the website, the code can cause small amounts of data to be stored on the client device (e.g., a HyperText Transport Protocol (HTTP) cookie). The data can include stateful information about, for example, preferences or previous interactions with the website, or information about the client device (e.g., device identifier, user account, or any other such information). In some implementations, the data can include an authentication token that informs the content provider that the client device previously authenticated with the content provider. The presence of the authentication token on the client device can mean the client device does not need to re-authenticate with the content provider (e.g., provide a user name and password again) to receive content from the content provider the next time the client device requests content from the content provider. Not having to re-authenticate with the content provider can save time and bandwidth as the client device does not have to go through the authentication processes each time the client device interacts with the content provider for additional data.

In some implementations, the web browser can partition the HTTP cookie at a predetermined amount of time (e.g., 24 hours) after the HTTP cookie is stored on the client device. Prior to being partitioned, the HTTP cookie can be accessed by content providers that caused the HTTP cookie to be stored on the client device in a third-party context, regardless of which first party website the client device is visiting. In some implementations, once partitioned, the content provider that caused the HTTP cookie to be stored on the client device can access multiple disjointed versions of the HTTP cookie, depending on which first-party website the client device is visiting. For example, a content provider www.example1.com will have difference cookies in a browser, depending on whether the user is visiting www.example2.com or www.example3.com. Thus, "partitioning" may refer to the process of making a cookie or other identifier exclusive to a specific content provider and the first-party website that the user is visiting and may be variously referred to as "sandboxing", "walling off", "locking", "making private", or by any other such term.

In some implementations, after the predetermined amount of time, the content provider can no longer access data on the client device that it caused to be stored there because the web browser includes a policy for limiting access. Additionally, some countries have implemented regulations that can prevent content providers from placing or accessing third-party cookies, and these regulations may be enforced by the browser.

However, in some implementations, a first content provider which the web browser previously visited can also provide content to the web browser via a second content provider. For example, the first content provider may host videos that can be embedded within the web pages of the second content provider. The user of the web browser may wish for the content provided via the second content provider (by the first content provider) to be selected according to previous session's data with the first content provider. For example, accessing the content may require authentication with the first content provider or selection based on user preferences. However, the session data (e.g., the authentication tokens and preferences) may not be available to the second content provider because the session data was stored on the client device as a HTTP cookie by the first content provider. As described above, the web browser can limit or prevent the second content provider's access to HTTP cookies of the first content provider. This can prevent single sign-on authentication or the selection of customized content. In this example, because the authentication is processed via the domain of the first content provider that the web browser is not directly visiting, the web browser can prevent the second content provider from accessing the authentication tokens (e.g., cookies) of the first content provider. This can prevent the web browser from authenticating with the first content provider during the session with the second content provider, and prevent the first content provider's content being displayed via the website of the second content provider.

In some implementations, through the use of only first-party cookies, the systems and methods described herein can enable the indirect transmission of session data between different domains. Additionally, as described below, the system can pass the session data through a hashing function so that the cookies of a given domain remain private and secure to the specific domain. Thus, the systems and methods described herein allow for exchange of information between third-party entities that would be blocked by typical web browsers and other computing devices that prevent cross-domain data exchange. This allows for rich, multi-source content (e.g., web pages (also referred to as primary content items) with embedded third-party content, mixed media, or other such content, which can generally be referred to as content items, secondary content items, or digital components), without sacrificing security of the client device and browser environment. In some implementations, by allowing session data to be retained and passed to third-party servers, some inter-server communications and/or client-server communications may be reduced or eliminated, reducing bandwidth requirements and potentially reducing latency and network congestion.

FIG. 1 illustrates a block diagram of an example system 100 for the indirect communication of data. The system 100 can enable the transmission of customized content to the client computing device 102. In some implementations, the content is customized or dynamically selected responsive to the indirection communication between the nodes of the system 100. The system 100 can include a client computing device 102 that is in communication with at least one data processing system 104. The system 100 can also include at least one content provider device 106 and a plurality of content publishing devices 108. The client computing device 102, the data processing system 104, the content provider device 106, and the content publishing device 108 can communicate with one another via a network 110. The client computing device 102, the data processing system 104, the content provider device 106, and the content publishing device 108 can each include a software or hardware-based communication interface. For example, the communication interface can be a hardware port through which the respective computing device connects to the network 110 or the communication interface can be a software component of, for example, a web browser executed by one of the computing devices. In some implementations, the network 110 may include a LAN network, a Wi-Fi network, a cellular network, a wide area network (WAN), a telephone network, such as the Public Switched Telephone Network (PSTN), a wireless link, a satellite link, a device-to-device mesh network, an intranet, the Internet, or combinations thereof.

The client device 102 can be any computing or other data processing device that includes one or more processors. For example, the client device 102 can be a mobile device, such as a mobile phone, tablet, or laptop computing device; a wearable computing device; a networked appliance (e.g., an Internet-of-Things or IoT appliance); a single computing device, such as a work station, laptop, or desktop computer; or multiple computing devices, such as a computer cluster, or server farm. In some implementations, the client device may comprise a virtual device executed by one or more hardware devices.

The client device 102 can render content provided by the content publishing device 108 and the data processing system 104. For example, the client device's processors can execute a web browser 112 (or other user agent, e.g. a media player, social media application, news reader application, etc.) that generates content requests. In some implementations, the client device 102 can transmit a content request to one of the content publishing devices 108. In response to the content request, the recipient content publishing device 108 can provide primary content (e.g., a web page, data file, media file, or other such content) to the client device 102. The primary content can include one or more content slots for secondary content, sometimes referred to as embedded content (e.g., images, media, executable scripts, etc. provided from another source or server). The content slots, which may be temporal (e.g. pre-roll, post-roll, or interstitial content during playback of primary content) and/or spatial (e.g. banners, embedded images in a text page, sidebars, etc.), can include code that when executed by the client device 102 cause the client device 102 to request or retrieve secondary content from a secondary content server, which can be the data processing system 104 or another content publishing device 108. In some implementations, the secondary content can be provided by the content publishing device 108 providing the primary content or a different content publishing device 108.

The primary content can also include executable scripts in other portions of the primary content that requests content for the content slots. For example, the primary content can include one or more scripts in the header of the primary content. The scripts can be JavaScript scripts. When the web browser 112 renders the primary content, the web browser 112 can execute the executable scripts in the header of the primary content prior to executing executable scripts in the content slots.

In some implementations, the client device 102 can receive and store data from one or more of the content publishing devices 108 and the data processing system 104. The data can be stored in any type and format, such as the form of a HTTP "cookie." The data may include an identifier, user name, account number, device number, unique identifier (UID), or any other such identifier, and may be encrypted, hashed, or otherwise obfuscated. The cookie for a specific content publishing device 108 can include stateful information that the content publishing device 108 can use during current and future communication sessions. For example, the stateful information can include preferences, previously provided from field data, authentication tokens, a unique identifier, or other settings. In some implementations, each of the cookies can expire. The client device 102 can delete the cookie once the cookie has expired. The cookie can expire when a duration specified by the cookie's time-to-live (TTL) flag is reached. In some implementations, the client device 102 can automatically purge the cookies after a predetermined duration. For example, the client device 102 can automatically purge the cookie after 1 to 30 days or when the browser session is closed. In some implementations, the web browser 112 provides only the content publishing device 108 that stored the cookie with the stateful information contained in the cookie. In some implementations, the cookies can expire for third-party use prior to reaching the time specified by the cookie's TTL flag. For example, for an initial period (e.g., the first 24 hours), the cookie can be viewed by content publishing devices 108 that saved the cookie to the client computing device 102, regardless of the primary content that the web browser 112 is accessing. After the first time period (and until the duration or time limit specified in the TTL flag is reached), the cookie can be partitioned. Based on the primary content the web browser 112 is visiting, the content publishing device 108 can access different partitions of the cookie.

The content publishing device 108 can include one or more processors. The content publishing device 108 can include a single computing device, a computer cluster, or a server farm. The content publishing devices 108 can provide primary content to the web browser 112 executing on the client computing device 102. The primary content can be a web page, data file, media file, or other such content. The web browser 112 can generate a HTTP request for the primary content and, responsive to receiving the request, the content publishing device 108 can transmit the primary content to the client computing device 102 for rendering by the web browser 112.

The content provider device 106 can be a single computing device, a computer cluster, or a server farm and can include one or more processors. The content provider devices 106 can provide secondary content to the web browser 112 for rendering in or with the primary content provided by the content publishing devices 108. For example, the primary content can include executable scripts that request secondary content from the content provider devices 106. As the web browser 112 renders the primary content, the web browser 112 can execute the executable scripts that request secondary content from the content provider devices 106. The web browser 112 can render the secondary content into one or more content slots of the primary content. The secondary content can include image-based files, video-based files, text-based files, any other type of media file, ads, or executable scripts. The secondary content can be content that is embedded into (or rendered with) primary content but is provided by a computing device, server, or source different from the computing device, server, or source of the primary content. In some implementations, the content provider device 106 can be a supply-side platform. The content provider device 106 can communicate with one or more demand-side platforms, such as the data processing system 104, to fulfill the requests for secondary content.

The data processing system 104 can include one or more processors. In some implementations, the data processing system can be a single computer, computer cluster, or server farm. In some implementations, the data processing system may include a virtual device executed by one or more hardware devices. In some implementations, the data processing system 104 can provide primary content like the content publishing devices 108. The data processing system 104 can also be a demand-side platform for providing content to fill one or more content slots in primary content provided by the content publishing devices 108 (or other data processing systems 104). For example, a user can access, via a web browser 112, primary content hosted by the data processing system 104. The user, via the web browser 112, can also access primary content hosted by the content publishing devices 108 that includes secondary content provided by the data processing system 104 to fill content slots of the primary content.

The data processing system 104 can enable the transmission or sharing of data after the web browser 112 has purged or otherwise made cookies unavailable to the data processing system 104. The data processing system 104 can generate unique identifiers that are mapped to device identifies to enable the data processing system 104 to provide customized content to the web browser 112 of a client computing device 102 after the web browser 112 has purged the cookie associated with the data processing system 104. The data processing system 104 can enable customized content to be presented to the client computing device 102 in systems that do not enable third-party cookies.

The data processing system 104 can include a connection manager 116 that can manage a matching database 114. The matching database 114 can include a plurality of entries or rows 118 that each include a key-value pair 120. Each of the key-value pairs 120 can include a header ID (illustrated as, and referred to as, a hb_ID) and a unique ID (illustrated as, and referred to as, a dps_uID). As described below, the hb_ID can be an ID that is generated (or retrieved) by the web browser 112 when the web browser 112 renders primary content. The dps_uID can be a unique ID that the data processing system 104 assigns to web browsers 112 from which the data processing system 104 receives hb_IDs. The connection manager 116 can store the hb_ID and the dps_uID as hash values in the matching database 114. The connection manager 116 can periodically purge the key-value pairs 120 from the matching database 114. For example, each of the key-value pairs 120 can include a purge flag or string that sets a date for when the key-value pair 120 should be purged from the matching database 114. The connection manager 116 can periodically (e.g., daily) scan the matching database 114 and delete any key-value pair 120 with expired purge flags. In other implementations, each key may have an associated creation date or expiration date, and the connection manager may scan the database for corresponding keys based on a present date. For example, each day, the connection manager 116 can delete any key-value pair 120 that are older than 15 days, 30 days, 60 days, or 90 days old.

The hb_IDs can be hashes that are generated based on data from the client computing device 102. The hb_IDs can be a randomly assigned character string. The hb_IDs can indicate which of the content publishing devices 108 the client computing device 102 initiated communications with. In some implementations, hb_ID can be a hash of a user agent, network location (e.g., IP address), identifier provided by the content publishing device 108 during a previous session, port numbers, media access control (MAC) addresses, application names, application versions, usernames, device types, or any other such information, or any combination thereof. The dps_uID can be a unique identifier that the data processing system 104 provides to the client computing device 102. In some implementations, the dps_uID can include a hash of the user agent, network location, port numbers, media access control (MAC) addresses, application names, application versions, usernames, device types, or any other such information, or any combination thereof. The dps_uID and the hb_ID for a given web browser 112 can be different. The hb_ID and the dps_uID, for a web browser 112, can be stored on the client computing device 102 in cookies. When saving the cookies, the client computing device 102 can set the TTL flag for the cookies to indicate when the cookies should be deleted from the client computing device 102.

The dps_uID or the hb_ID can be concatenated with a time stamp, a random number, a pseudo random number, a counter value, a sequence number, or other source of entropy. By concatenating the IDs with entropy, the IDs can become one-time only so that third parties cannot take advantage of the identifiers via re-use. In some implementations, the web browser 112 can transmit only hashes of the dps_uID or hb_ID to protect the user's privacy and security.

The connection manager 116 can receive calls and requests from the client computing device 102 and populate the matching database 114. For example, each of the content publishing devices 108 can include executable scripts in their primary content that, when executed, retrieve the dps_uID from the client computing device 102 and transmit the dps_uID to the data processing system 104. The data processing system 104 can provide the dps_uID to the client computing device 102 in a cookie when the client computing device 102, via the web browser 112, renders primary (or other) content provided by the data processing system 104. For example, the content can be a web page hosted by the data processing system 104. Responsive to rendering the web page, the executable scripts in the web page can cause the web browser 112 to store a cookie on the client computing device 102. When rendering primary content provided by the content publishing devices 108, the executable scripts in the primary content provided by the content publishing devices 108 can retrieve the data processing system's cookie stored on client computing device 102. In some implementations, the data processing system's cookie is only available to the executable scripts embedded in the content publishing device's primary content if the data processing system's cookie was stored on the client computing device 102 within a predetermined time range (e.g., within the last 24 hours). The executable scripts from the content publishing device 108 can transmit the data processing system's cookie to the data processing system 104 in the header of an HTTP call. The hb_ID for the client computing device 102 can be included in the call as a URL parameter.

Figure 2:
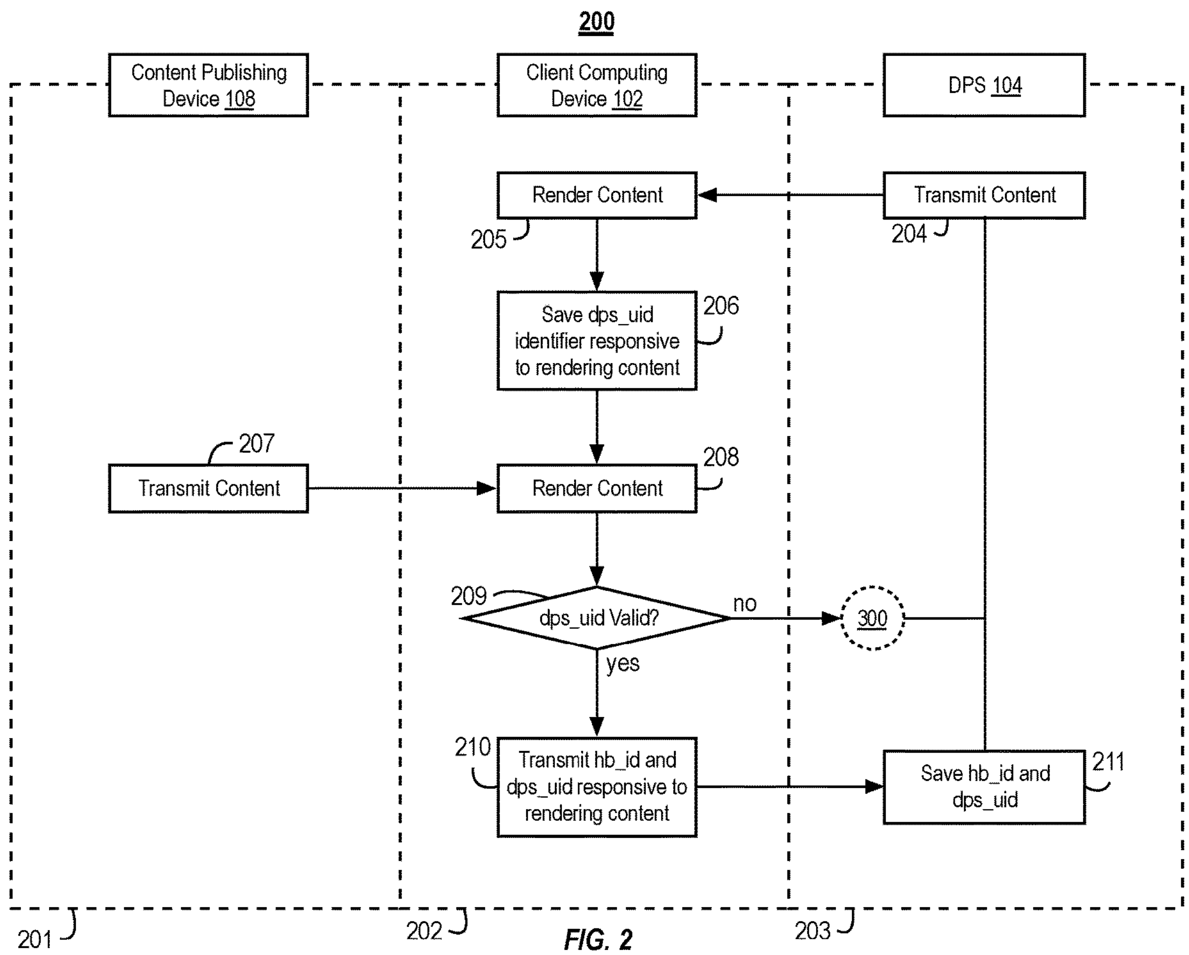
FIG. 2 illustrates a block diagram of an example method to populate a matching database for use in the system illustrated in FIG. 1, according to one implementation.

FIG. 2 illustrates a block diagram of an example method 200 to populate a matching database 114. Referring also to FIG. 1, the steps illustrated in block 201 can be performed by the content publishing device 108, the steps illustrated in block 202 can be performed by the client computing device 102, and the steps illustrated in block 202 can be performed by the data processing system 104. As discussed above, in many implementations one or more of these devices or systems may comprise a plurality of devices (e.g. server cloud, farm, etc.).

The method 200 can include transmitting content to the client computing device 102 (step 204). The content transmitted to the client computing device 102 can be primary content, such as a web page, that is hosted by the data processing system 104. The data processing system 104 can transmit the primary content to the client computing device 102 in response to receiving a request from the web browser 112 executing on the client computing device 102.

The method 200 can include the client computing device 102 rendering the primary content (step 205). The primary content can include executable scripts that are executed by the web browser 112 that received the primary content. Execution of the executable scripts can cause the web browser 112 to save a dps_uID to the client computing device 102 in the form of a HTTP cookie (step 206). When saving the cookie to the client computing device 102, the web browser 112 can set a TTL flag on the cookie. The TTL flag can indicate a time or condition when the cookie should be purged or deleted from the client computing device 102. For example, the TTL flag can be set for 1 week, 2 weeks, 3 weeks, or 4 weeks from the date when the cookie is saved to the client computing device 102. The web browser 112 can also set a third-party flag for the cookie. The third-party flag can indicate a time after which third-parties (e.g., content publishing devices 108 that did not set the cookie) can no longer access the cookie. The date of the third-party flag is less than the date of the TTL flag. For example, the third-party flag can be set to 1 hour, 1 day, or 1 week from when the cookie is saved to the client computing device 102. In some implementations, when web browser 112 re-renders primary content provided by the data processing system 104 (e.g., the web browser 112 is used to revisit one or more web sites provided by the data processing system 104), the web browser 112 can reset the TTL flag and/or the third-party flag.

At a later time, a content publishing device 108 can transmit primary content to the client computing device 102 (step 207). The primary content can be a web page or other content that is hosted by the content publishing device 108. The content publishing device 108 can provide the primary content to the client computing device 102 responsive to the web browser 112, executing on the client computing device 102, transmitting a request for content to the content publishing device 108.

The client computing device 102 can render the primary content provided by the content publishing device 108 (step 208). The primary content provided by the content publishing device 108 can include executable scripts. The executable scripts can be in a header of the primary content such that the web browser 112 executes the scripts prior to executing the scripts contained in the body of the primary content. For example, the executable scripts in the header can be executed by the web browser 112 before the web browser 112 executes the executable scripts contained in the content slots of the primary content. One or more of the executable scripts can be provided to the content publishing device 108 by the data processing system 104 for inclusion in the primary content made available by the content publishing device 108. For example, the data processing system 104 can provide to the content publishing device 108 an executable script that retrieves the data processing system's dps_uID that is stored on the client computing device 102 when the client computing device 102 renders primary content from the content publishing device 108.

The client computing device 102 can determine if the dps_uID is active, unexpired, or valid (step 209). The executable scripts in the header of the primary content can cause the web browser 112 to determine if the dps_uID is valid. The dps_uID can be stored in a cookie provided to the client computing device 102 by the data processing system 104. The cookie (and dps_uID) can be valid for third-party use prior to the time indicated by the third-party flag. For example, the web browser 112 can save a cookie from the data processing system 104 with the dps_uID at {2018-01-16T20:58:10+00:00}. The web browser 112 can set the third-party flag to {2018-01-17T20:58:10+00:00} (1 day from the date and time the cookie was saved to the client computing device 102) and the TTL flag to {2018-02-15T20:58:10+00:00} (30 days from the date and time the cookie was saved to the client computing device 102). When determining if the dps_uID is still valid, the web browser 112 can determine if it is before {2018-01-17T20:58:10+

00:00}, the time indicated by the third-party flag. If it is before the time indicated by the third-party flag, the web browser 112 can determine the dps_uID is valid.

In some implementations, determining whether the dps_uID is valid can include determining if the primary content from the content publishing device 108 has read or write access to the cookie that contains the dps_uID. For example, the web browser 112 can periodically analyze the cookies stored on the client computing device 102 and determine if the read and write access to the cookies should be changed or if the cookie should be purged. The cookie can be purged (e.g., deleted) when the date indicated by the cookie's TTL is reached. The web browser 112 can partition a cookie (e.g., change which primary content items can access the cookie) when the date indicated by the cookie's third-party flag is reached. For example, 24 hours after the cookie is saved to the client computing device 102, the web browser 112 can partition the cookie such that only the content publishing device 108 (or data processing system 104) that provided the cookie can access the cookie. When the date indicated by the TTL flag is reached, the web browser 112 can delete the cookie. The web browser 112 can reset the TTL flag and the third-party flag for a cookie each time the web browser 112 interacts with the data processing system 104 or the content publishing device 108 that provided the cookie. For example, if the cookie was provided by example.com, each time the web browser 112 renders a web page under the example.com domain, the web browser 112 can reset the TTL and third-party flags of the original cookie.

If, at step 209, the dps_uID is not valid, has expired, or the cookie is inaccessible, the method 200 can return to the start of the method (e.g., (step 204)). For example, a user can continue to browse web pages with the web browser 112. The data processing system 104 and/or the content publishing device 108 can provide the web pages. If the web browser 112 determines the dps_uID is not valid, the user may revisit a web page provided by the data processing system 104. Rendering of the web page (e.g., primary content) provided by the data processing system 104 can reset the TTL and third-party flags for the cookie, which can extend or reset the time frame for which the dps_uID is valid.

If, at step 209, the dps_uID is not valid, the method 200 can include performing one or more of the steps of method 300, described in more detail below in connection with FIG. 3. In some implementations, during the population of the matching database 114, the method 200 can include not performing the steps of the method 300. In some implementations, once the matching database 114 is populated, the steps of the method 300 can be performed once the dps_uID is determined to not be valid.

If, at step 209, the dps_uID is valid, the web browser 112 can transmit the dps_uID and a hb_ID to the data processing system 104. The hb_ID can be a ID generated as the web browser 112 renders the header of the primary content from the content publishing device 108 at step 208. The web browser 112 can transmit the dps_uID and the hb_ID to the data processing system 104 in a call to the data processing system 104. The dps_uID can be included in a header of the call and the Header ID can be included as a URL parameter of the call.

The method 200 can include the data processing system 104 saving the dps_uID and the hb_ID (step 211). The data processing system 104 can save the dps_uID and the hb_ID to the matching database 114 to populate the matching database 114. For example, the data processing system 104 can save the dps_uID and the hb_ID as key value pairs in the matching database 114. The dps_uID can be the key and the hb_ID can be the value. As the method 200 is repeated, and the client computing device 102 receives primary content from additional content publishing devices 108, hb_IDs associated with the additional content publishing devices 108 can be stored in association with the dps_uID of the data processing system 104. For example, the dps_uID from the data processing system 104 can be stored at the location indicated by a hash of the hb_ID. The method 200 can repeat any number of times as a user of the client computing device 102 uses the web browser 112 to visit primary content provided by the data processing system 104 and/or the content publishing device 108.

Figure 3:
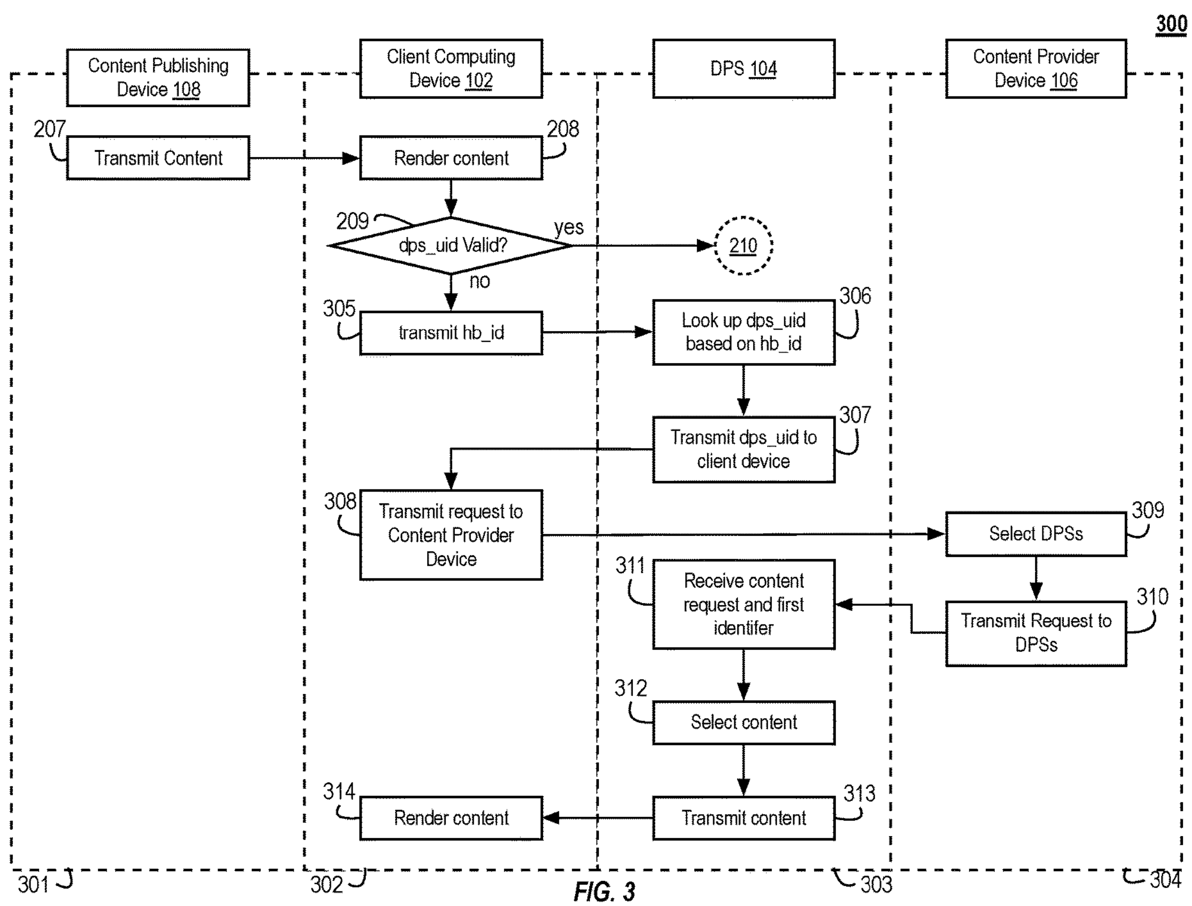
FIG. 3 illustrates a block diagram of an example method to provide custom content in the system illustrated in FIG. 1, according to one implementation.

FIG. 3 illustrates a block diagram of an example method 300 to provide custom content. Referring also to FIG. 1, the steps in the block 301 can be performed by the content publishing device 108, the steps in the block 302 can be performed by the client computing device 102, the steps in the block 303 can be performed by the data processing system 104, and the steps in the block 304 can be performed by the content provider device 106.

The method 300 can be performed after the matching database 114 is populated. For example, the method 300 can be performed after the method 200, illustrated in FIG. 2, is completed one or more times. As described above, the steps of the method 300 can be incorporated into the method 200. For example, the steps 305-314 can occur after the dps_uID is determined to not be valid a step 209 of the method 200.

The method 300 can be incorporated into the method 200 or the method 300 can operate independently of the method 200, for example, once the matching database 114 is populated.

The method 300 can include steps 207-209 from the method 200. For example, the method 300 can include the content publishing device 108 transmitting content to the client computing device 102 (step 207). The content publishing device 108 can transmit primary content, such as a web page, to the client computing device 102. The content publishing device 108 can transmit the primary content to the client computing device 102 responsive to receiving a request from the client computing device 102. For example, a web browser 112 executing on the client computing device 102 can transmit an HTTP request to the content publishing device 108 for a web page. In response to the request, the content publishing device 108 can respond with the requested web page.

The method 300 can include rendering the primary content (step 208). The web browser 112, executing on the client computing device 102, can render the primary content once received by the client computing device 102. The primary content can include a header portion and a body portion. The web browser 112 can render the header portion prior to rendering the body portion of the primary content. The header can include executable scripts. Responsive to executing the executable scripts, the web browser 112 can retrieve the dps_uID that can be stored in a cookie provided by the data processing system 104. For example, the dps_uID and cookie can be provided by the data processing system 104 during the steps similar to steps 204-206 of method 200. The executable scripts can also cause the web browser 112 to retrieve to generate a hb_ID that corresponds to the content publishing device 108.

The method 300 can include determining if the dps_uID is valid (step 209). For example, the web browser 112 can determine if the date specified by the third-party flag of the cookie provided by the data processing system 104 (and containing the unique ID) has passed. If the date specified by the third-party flag has passed, the web browser 112 can determine the dps_uID is no longer valid. In some implementations, the web browser 112 determines the dps_uID is not valid because the cookie is partitioned and the executable scripts provided by the content publishing device 108 do not have read or write access to the cookie provided by the data processing system 104. In some implementations, the web browser 112 can determine the dps_uID is not valid if the amount of time between the steps 205 and 208 in method 200 is above a predetermined threshold. For example, if the time is above the predetermined threshold (e.g., 24 hours), the date set in the third-party flag can pass and the web browser 112 can partition the cookie such that only executable scripts from the data processing system 104 can access the dps_uID. At step 209, if the dps_uID is valid, the method 300 can proceed as described in relation to step 210 of method 200, illustrated in FIG. 2.

The method 300 can include transmitting the hb_ID to the data processing system 104 (step 305). Responsive to determining that the dps_uID is not valid, the web browser 112 can transmit the hb_ID to the data processing system 104 as a URL parameter. The web browser 112 can transmit the hb_ID to the data processing system 104 and wait for a response prior to rendering the body of the primary content.

The method 300 can include looking up the dps_uID based on the hb_ID (step 306). The connection manager 116 can retrieve the dps_uID from the matching database 114. The connection manager 116 can use the hb_ID to lookup the dps_uID in the matching database 114. For example, the dps_uID can be stored at a location in the matching database 114 that is identified by a hash of the hb_ID.

The method 300 can include the data processing system 104 transmitting the dps_uID to the client computing device 102 (step 307). The data processing system 104 can transmit the dps_uID to the client computing device 102 in response to the client computing device 102 transmitting the hb_ID to the data processing system 104. The data processing system 104 can, based on the dps_uID and hb_ID, determine other content parameters to return to the client computing device 102. The content parameters can include a bid price for content, content preferences (e.g., what types of content the user may be interested in), authentication information, state information, content size parameters, or any combination thereof. The data processing system 104 can transmit the dps_uID and the content parameters to the client computing device 102 as key value pairs.

The method 300 can include transmitting a request to the content provider device 106 (step 308). The web browser 112 can generate the request responsive to rendering the primary content transmitted to the client computing device 102 at step 207. For example, the web browser 112 can transmit the hb_ID to the data processing system 104 (at step 305) responsive to rendering the header of the primary content. The web browser 112 can transmit the request (at step 308) responsive to rendering the body of the primary content. For example, the primary content can include content slots. The content slots can include executable scripts. Execution of the executable scripts, by the web browser 112, can cause the web browser 112 to generate and transmit content requests to remove computing devices, such as the content provider device 106.

The content provider device 106 can select one or more data processing systems 104 to fulfill the request (step 309). In some implementations, the content provider device 106 can be a supply side platform. The supply side platform can enable the primary content from a content publishing device 108 to make content requests, when rendered by a web browser 112 executed by a client computing device 102, to multiple potential suppliers of content. The suppliers of content can be demand side platforms (such as data processing systems 104), content networks, and content exchanges. The one or more data processing systems 104 can include the data processing system 104 to which the web browser 112 transmitted the hb_ID at step 305.

The method 300 can include transmitting the request to the one or more data processing systems 104 (step 310). The content provider device 106 can transmit the request to the one or more data processing systems 104. The request transmitted to the data processing system 104 that received the dps_uID at step 305 can include the dps_uID and/or key-value pairs that include the dps_uID and content parameters. The data processing system 104 can receive the request, the dps_uID, and/or the key-value pairs that include the dps_uID and content parameters.

The method 300 can include selecting content (step 312). The data processing system 104 can select the content based on the content requirements contained in the request, the dps_uID, and/or the content parameters. For example, the content requirements can indicate a type (e.g., banner content or movie content) or a size of the content that should be returned to the web browser 112. The data processing system 104 can use the dps_uID and/or content parameters to select content that is more relevant to the user of the web browser 112. For example, the data processing system 104 can use the dps_uID and/or content parameters to look up stored preferences of the user. In some implementations, when the request is transmitted to a plurality of data processing systems 104 at step 310, the data processing systems 104 can return a bid value to the content provider device 106. Using the bid value, the content provider device 106 can conduct an auction to select which of the data processing systems 104 will transmit their content to the client computing device 102.

The method 300 can include transmitting the content (step 313). Responsive to selecting the content, the data processing system 104 can transmit the content to the client computing device 102. In some implementations, the data processing system 104 can transmit the content to the content provider device 106, which can forward the content to the client computing device 102.

The method 300 can include rendering the content (step 314). The web browser 112 can render the received content into a content slot of the primary content that the web browser 112 began to render during step 305.

According to at least one aspect of the disclosure, a system for network communication through an intermediary includes a data processing system that includes a communication interface and a processor executing a connection manager. The communication interface can be configured to receive, from a client computing device, a first content request to fill a content slot. The first content request can include a first client device identifier for a client device. The connection manager can be configured to determine a second client device identifier for the client device based on the first client device identifier and a content parameter based on the second client device identifier. The communication interface can be configured to transmit, to the client computing device, the content parameter and the second client device identifier in response to receiving the first content request. The communication interface can receive, from a content provider, a second content request to fill the content slot. The second content request can include the second client device identifier and the content parameter. The connection manager can be configured to select a digital component based on the second client device identifier and the content parameter. The communication interface can be configured to transmit the digital component to the client computing device in response to the second content request to fill the content slot.

In some implementations, the first content request can include at least one of an indication of a user agent or an indication of a network location. The connection manager can be configured to determine the second client device identifier based on at least one of the indication of the user agent or the indication of the network location.

The communication interface can be configured to transmit, to the client computing device, the second client device identifier. The second client device identifier can include an expiration date. The communication interface can be configured to receive, from the client computing device, the first client device identifier and the second client device identifier prior to the expiration date. The connection manager can be configured to associate the second client device identifier with the first client device identifier.

The communication interface can be configured to receive the first content request to fill the content slot responsive to the client computing device rendering a first portion of a primary content item. The communication interface can be configured to receive the second content request responsive to the client computing device rendering a second portion of the primary content item.

According to at least one aspect of the disclosure, a method for network communication through an intermediary can include receiving, by a data processing system and from a client computing device, a first content request to fill a content slot. The first content request can include a first client device identifier for a client device. The method can include determining, by the data processing system, a second client device identifier for the client device based on the first client device identifier and a content parameter based on the second client device identifier. The method can include transmitting, by the data processing system to the client computing device, the content parameter and the second client device identifier in response to receiving the first content request. The method can include receiving, by the data processing system from a content provider, a second content request to fill the content slot. The second content request can include the second client device identifier and the content parameter. The method can include selecting, by the data processing system, a digital component based on the second client device identifier and the content parameter. The method can include transmitting, by the data processing system, the digital component to the client computing device in response to the second content request to fill the content slot.

In some implementations, the first content request can include at least one of an indication of a user agent or an indication of a network location. The method can include determining the second client device identifier based on at least one of the indication of the user agent or the indication of the network location.

In some implementations, the method can include transmitting, by the data processing system to the client computing device, the second client device identifier. The second client device identifier can include an expiration date. The method can include receiving, by the data processing system from the client computing device, the first client device identifier and the second client device identifier prior to the expiration date. The method can include associating, by the data processing system, the second client device identifier with the first client device identifier.

The method can include receiving the first content request to fill the content slot responsive to the client computing device rendering a first portion of a primary content item. The method can include receiving the second content request responsive to the client computing device rendering a second portion of the primary content item.

According to at least one aspect of the disclosure, a method for indirect communication between networked nodes can include generating, by a client computing device, a first client device identifier of the client computing device responsive to rendering a first portion of a primary content item. The method can include determining, by the client computing device, that a second client device identifier of the client computing device is invalid. The method can include transmitting, by the client computing device, the first client device identifier to a data processing system based on determining the second client device identifier of the client computing device is invalid. The method can include receiving, from the data processing system, a valid second client device identifier. The method can include transmitting, to a content provider, a content request responsive to rendering a second portion of the primary content item. The content request can include the valid second client device identifier. The method can include receiving, from the content provider, a content item based on the valid second client device identifier of the content request. The method can include rendering, by the client computing device, the content item in a content slot of the primary content item.

In some implementations, the method can include invalidating, by the client computing device, the second client device identifier after a predetermined length of time from receiving the second client device identifier. The method can include receiving a content parameter with the valid second client device identifier. The content request can include the content parameter.

In some implementations, the method can include generating the first client device identifier based on at least one of a user agent or an indication of a network location. The method can include transmitting, responsive to rendering a first portion of a second primary content item, the first client device identifier and the valid second client device identifier to the data processing system.

Figure 4:
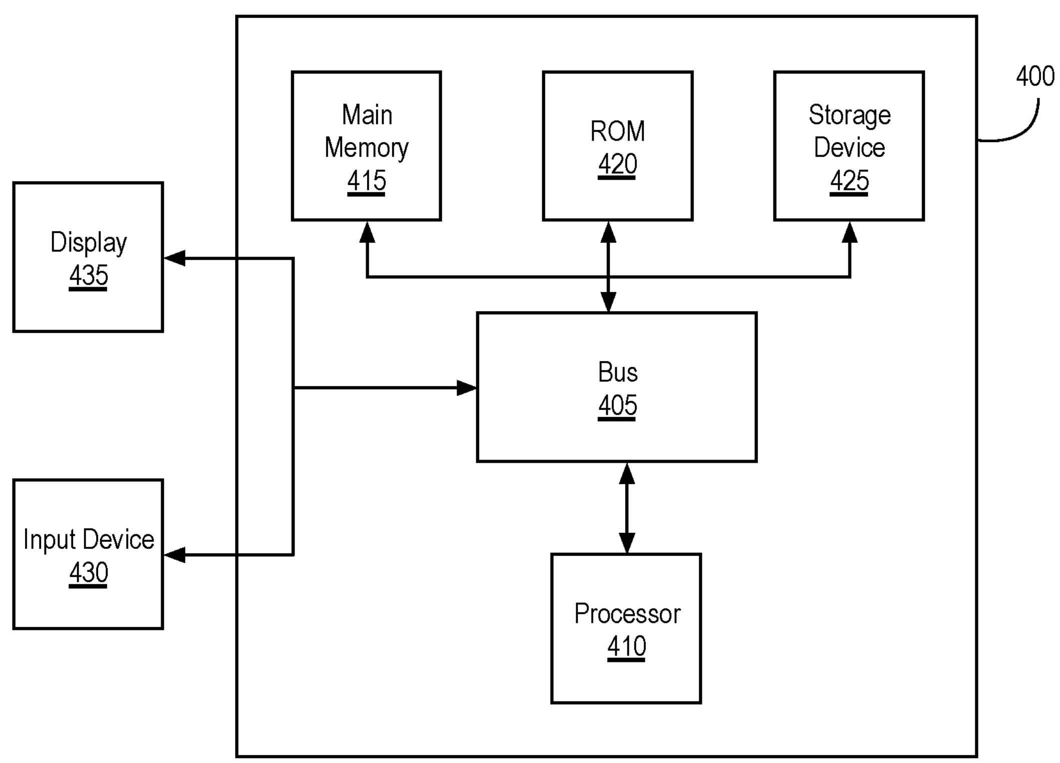
FIG. 4 illustrates a block diagram of an implementation of a computer system, according to one implementation.

FIG. 4 illustrates a block diagram of an implementation of a computer system 400. The computer system or computing device 400 can include or be used to implement the system 100 or its components such as the data processing system 105, the client computing device 102, the content publishing device 108, or the content provider device 106. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. The main memory 415 can be or include the connection database 114 and cluster database 118. The main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk, or optical disk, can be coupled to the bus 405 to persistently store information and instructions. The storage device 425 can include or be part of the connection database 114 and/or the cluster database 118.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of a data processing system 104, the client device 102, or other components of FIG. 1.

The processes, systems, and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 3, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system", "computing device", "component", or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The components described above in relation to FIG. 1 can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the communication manager 106) to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit). Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back-end component (e.g., as a data server), or that includes a middleware component (e.g., an application server), or that includes a front-end component (e.g., a client computer having a graphical user interface or a web browser through which a user can interact with an implementation of the subject matter described in this specification), or a combination of one or more such back-end, middleware, or front-end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad-hoc peer-to-peer networks).

The computing system such as system 100 or system 400 can include clients and servers. A client and server are generally remote from each other and typically interact through a communication network (e.g., the network 110). The relationship of client and server arises by virtue of computer programs running on the respective computers and having a client-server relationship to each other. In some implementations, a server transmits data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the data processing system from the client device or the content provider computing device or the service provider computing device).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed in connection with one implementation are not intended to be excluded from a similar role in other implementations or implementations.

The phraseology and terminology used herein is for the purpose of description and should not be regarded as limiting. The use of "including", "comprising", "having", "containing", "involving", "characterized by", "characterized in that", and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation", "some implementations", "one implementation", or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and B" can include only 'A', only 'B', as well as both 'A' and 'B'. Such references used in conjunction with "comprising" or other open terminology can include additional items.

Where technical features in the drawings, detailed description, or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed:

1. A method, comprising:

receiving, by a data processing system, from a client device, a request for content comprising a first identifier of the client device;

selecting, by the data processing system, in response to the request for content, content for display on an information resource presented on the client device based on the first identifier of the client device included in the request for content;

transmitting, by the data processing system, the content to the client device, the content identifying a content provider;

receiving, by the data processing system, a second message from the client device in response to an interaction with the content, the second message identifying a server of the content provider;

generating, by the data processing system, responsive to receiving the second message, a second identifier that (i) identifies a session of the client device, and (ii) enables determination of the first identifier by the data processing system using the second identifier, wherein the second identifier is different from the first identifier; and transmitting, by the data processing system, to the client device, a response to the second message, the response including the second identifier, and a script that causes the client device to include the second identifier as a uniform resource locator (URL) parameter in a communication to a server.

2. The method of claim 1, further comprising:

receiving, by the data processing system, from the content provider, a third message including the second identifier and information about interactions performed by the client device with a second information resource provided by the content provider;

selecting, by the data processing system, responsive to receiving a second request for content from the client device, second content for display in a second information resource presented on the client device based on the second identifier and the information about interactions performed by the client device; and providing, by the data processing system, the second content to the client device for display.

3. The method of claim 1, wherein generating the second identifier further comprises:

generating, by the data processing system, the second identifier based on a web browser of the client device; and storing, by the data processing system, the second identifier in a database in association with the first identifier, the association enabling determination of the first identifier using the second identifier.

4. The method of claim 1, wherein transmitting the second identifier to the client device further comprises transmitting, by the data processing system, the second identifier as part of a cookie.

5. The method of claim 1, wherein selecting the content for display further comprises:

determining, by the data processing system, a type of content associated with the first identifier; and selecting, by the data processing system, the content for display based on the type of content associated with the first identifier.

6. The method of claim 1, wherein selecting the content is further based on a content requirement specified in the request for content.

7. The method of claim 1, wherein generating the second identifier further comprises generating a unique identifier associated with a session of the client device as the second identifier.

8. The method of claim 1, further comprising providing, by the data processing system, the information resource for presentation on the client device, the information resource including a second script that when executed causes the client device to transmit a first message to the data processing system.

9. A system, the system comprising:

a data processing system comprising one or more processors and a memory, the data processing system configured to:

receive, from a client device, a request for content comprising a first identifier of the client device of the primary content;

select, in response to the request for content, content for display on an information resource presented on the client device based on the first identifier of the client device included in the request for content;

transmit secondary content to the client device, the content to the client device, the content identifying a content provider;

receive a second message from the client device in response to an interaction with the content, the second message identifying a server of content provider;

generate, responsive to receiving the second message, a second identifier that (i) identifies a session of the client device, and (ii) enables determination of the first identifier by the data processing system using the second identifier, wherein the second identifier is different from the first identifier; and transmit, to the client device, a response to the second message, the response including the second identifier, and a script that causes the client device to include the second identifier as a uniform resource locator (URL) parameter in a communication to a server.

10. The system of claim 9, wherein the data processing system is further configured to:

receive, from the content provider, a third message including the second identifier and information about interactions performed by the client device with a second information resource provided by the content provider;

select, responsive to receiving a second request for content from the client device, second content for display in a second information resource presented on the client device based on the second identifier and the information about interactions performed by the client device; and provide the second content to the client device for display.

11. The system of claim 9, wherein in generating the second identifier, the data processing system is further configured to:

generate the second identifier based on a web browser of the client device; and store the second identifier in a database in association with the first identifier, the association enabling determination of the first identifier using the second identifier.

12. The system of claim 9, wherein in transmitting the second device identifier to the client device, the data processing system is further configured to transmit the second identifier as part of a cookie.

13. The system of claim 9, wherein in selecting the content for display, the data processing system is further configured to:

determine a type of content associated with the first identifier; and select the content for display based on the type of content associated with the first identifier.

14. The system of claim 9, wherein the data processing system is configured to select the content further based on a content requirement specified in the request for content.

15. The system of claim 9, wherein in determining the second identifier, the data processing system is further configured to generate a unique identifier associated with a session of the client device as the second identifier.

16. The computer-readable storage medium of claim 15, wherein generating the second identifier further comprises:

generating the second identifier based on a web browser of the client device; and storing the second identifier in a database in association with the first device identifier the association enabling determining of the first identifier using the second identifier.

17. The computer-readable storage medium of claim 15, wherein transmitting the second identifier to the client device further comprises transmitting the second identifier as part of a cookie.

18. The computer-readable storage medium of claim 15, wherein selecting the content for display further comprises:

determining a type of content associated with the first identifier; and selecting the content for display based on the type of content associated with the first identifier.

19. The system of claim 9, wherein the data processing system is further configured to provide the information resource for presentation on the client device, the information resource including a second script that when executed causes the client device to transmit a first message to the data processing system.

20. A non-transitory computer-readable storage medium storing instructions, the instructions being executable by one or more processors to perform a method, comprising:

receiving, from a client device, a request for content comprising a first identifier of the client device;

selecting, in response to the request, content for display on the client device based on the first identifier of the client device included in the request;

transmitting the content to the client device, the content identifying a content provider;

receiving a second message from the client device in response to an interaction with the content, the second message identifying a server of content provider;

generating, responsive to receiving the second message, a second identifier that (i) identifies a session of the client device, and (ii) enables determination of the first identifier using the second identifier, wherein the second identifier is different from the first identifier; and transmitting, to the client device, a response to the second message, the response including the second identifier, and a script that when executed causes the client device to include the second identifier as a uniform resource locator (URL) parameter in a communication to the content provider;

receiving, from the content provider, a third message including the second identifier and information about interactions performed by the client device with a second information resource provided by the content provider;

selecting, responsive to receiving a second request for content from the client device, second content for display in a second information resource presented on the client device based on the second identifier and the information about interactions performed by the client device; and providing the second content for display on the client device.

* * * * *